United States Patent [19]

Meyer et al.

[11] Patent Number: 4,971,781

[45] Date of Patent: Nov. 20, 1990

[54] WORKING UP SODIUM SULFATE-CONTAINING RESIDUES

[75] Inventors: Hermann Meyer, Mannheim; Rainer Roemer, Laudenbach; Gerhard Pforr, Ludwigshafen, all of Fed. Rep. of Germany

[73] Assignee: BASF Aktiengesellschaft, Ludwigshafen, Fed. Rep. of Germany

[21] Appl. No.: 400,528

[22] Filed: Aug. 30, 1989

[30] Foreign Application Priority Data

Sep. 2, 1988 [DE] Fed. Rep. of Germany ....... 3829826

[51] Int. Cl.$^5$ ..................... C01B 17/52; C01B 17/74
[52] U.S. Cl. .................................. 423/532; 423/540; 423/541 R; 423/542
[58] Field of Search ............. 423/541 R, DIG. 3, 540, 423/531, 532, 542, 541 R, 561.1

[56] References Cited

U.S. PATENT DOCUMENTS

| | | | |
|---|---|---|---|
| 2,726,143 | 12/1955 | Mares | 423/541 |
| 3,061,408 | 10/1962 | Lurie | 423/DIG. 3 |
| 4,237,103 | 12/1980 | Prible | 423/DIG. 3 |
| 4,704,136 | 11/1987 | Weston et al. | 423/566 |
| 4,808,264 | 2/1989 | Kignell | 423/DIG. 3 |
| 4,857,282 | 8/1989 | Mullen | 423/DIG. 3 |

*Primary Examiner*—Jeffrey E. Russel
*Assistant Examiner*—Stephen G. Kalinchak
*Attorney, Agent, or Firm*—Keil & Weinkauf

[57] ABSTRACT

Sodium sulfate-containing residues are worked up by reducing the sulfate by a process in which the sulfate or a mixture or solution of the sulfate is thermally cleaved by adding oxygen, air or oxygen-enriched air at above 1000° C., in particular above 1200° C., under reducing conditions to give gaseous sulfides and oxides of sulfur as well as alkaline slag. The sulfur compounds contained in the gaseous reaction products can be further processed to sulfur, sulfur dioxide and sulfuric acid.

4 Claims, No Drawings

WORKING UP SODIUM SULFATE-CONTAINING RESIDUES

The present invention relates to a process for working up sulfate-containing residues by reducing the sulfates.

In many large-scale industrial processes, for example in the paper industry, the chemical industry and recently also in stack gas desulfurization plants, wastewaters are formed which contain, inter alia, sulfates in dissolved form, for example sodium sulfate. At present, these wastewaters are passed into rivers, in many cases without treatment; some of them are concentrated to give residues which can be dumped or are subjected to additional treatment processes and then worked up to obtain pure sodium sulfate.

The sodium sulfate which can be recovered from wastewaters is in general more expensive to prepare than the sodium sulfate obtained, for example, from glauberite or brines from salt lakes by known methods. Recycling of sodium sulfate is frequently prevented by technical problems.

Another possible method for working up sodium sulfate is electrolysis in the melt or in aqueous solution. The known chemical processes have not yet been developed to industrial maturity. However, very pure aqueous solutions are required for electrolysis.

Industrial processes for the reduction of sodium sulfate with carbon have long been known. Processes for reduction with hydrogen have also been investigated. The use of other reducing agents, for example hydrocarbons or carbon monoxide, has also been described.

The known industrial processes for the reduction of sodium sulfate to sodium sulfide with carbon operate at about 600–1200° C, preferably about 700–1000° C. The sodium sulfate, mixed with carbon, is reacted in hearth furnaces, shaft furnaces or rotary kilns at about 700–1000° C. to give a melt. The disadvantages of these processes are the expensive, batchwise procedures for working up of the melt and of the gaseous reaction products.

Attempts have therefore also been made to carry out the reduction of the sodium sulfate with gases, for example with hydrogen, in a rotating tube or a fluidized bed at about 900° C. This process is made technically more difficult to carry out by the formation of eutectic mixtures of sodium sulfate and the product sodium sulfide, which are in the form of a melt at the required reaction temperatures and have an adverse effect on the reaction.

It is an object of the present invention to provide a process for working up sulfate-containing residues by reduction to sulfides or oxides of sulfur, which permits recycling of the sulfur, preferably for working up sodium sulfates dissolved in wastewaters, in which the disadvantages of the known processes are not encountered, ie. additional process stages for the treatment and concentration of sulfate-containing wastewaters, the formation of melts, labour-intensive recovery of the desired sulfur-containing product from the melt and the production of harmful waste gases are avoided.

We have found that this object is achieved and that sodium sulfate-containing residues in solution or liquid form can be worked up by reduction of the sulfate, if the sulfate or a mixture or solution of the sulfate is thermally cleaved at above 1000° C., in particular above 1200° C., under reducing conditions to give gaseous sulfides and oxides of sulfur as well as alkaline slag. The reducing conditions being achieved by adding simultaneously with the sulfate a reducing agent such as coal dust, heavy fuel oil, natural gas or hydrogen.

The process is particularly suitable for working up sodium sulfate-containing wastewaters and can be carried out in suitable burners fueled by coal dust, heavy fuel oil, natural gas or hydrogen.

However, it is also possible to work up residues which contain other alkali metal sulfates or alkaline earth metal sulfates or mixtures of these with sodium sulfate.

To heat up sulfate-containing residues, solid residues can be introduced pneumatically, or wastewaters sprayed, into a space in which temperatures above 1000° C, in particular above 1200° C, are maintained by supplying a sufficient amount of energy. The substances introduced into the space of high energy density and temperature are thermally cleaved to give gaseous products and alkaline slag. Thus, surprisingly, the sulfur-containing cleavage products can be obtained completely in the gaseous state at above 1500° C and with a suitable choice of the energy supply and can be discharged from the reaction space. By adding reducing components, for example hydrogen, methane, carbon monoxide and carbon, the formation of sulfur compounds which are gaseous in the normal state, for example hydrogen sulfide and carbonyl sulfide, is promoted. The process can be carried out under atmospheric or superatmospheric pressure, for example from 20 to 40 bar.

The reaction takes place particularly advantageously if the reducing agent contains silicate-containing ballast substances, or if silicate-containing compounds are added together with the reducing agent. By means of such a silicate-containing ballast in the fuel used expulsion of the sulfur-containing gases and the flow properties of the slag to be removed are advantageously affected. The free-flowing slag obtained can be removed without difficulty from the cleaving zone quenched in water and used as silicate-containing building material.

The advantages of the process are that the working up of the sulfate-containing residues can be carried out continuously without pretreatment, harmful waste gases and harmful solid residues are not formed and sulfur, sulfur dioxide and sulfuric acid can be prepared from the resulting gaseous reaction products, such as sulfides or oxides of sulfur, by known methods in a simple manner.

EXAMPLE 1

A process for spraying sodium sulfate-containing wastewaters into a vertical burner for the high pressure gassification of vacuum residue.

By adding air, a reaction temperature of from 1200 to 1500° C. is reached. The reaction gas contains the sulfur from the sulfate as 70% by volume of $H_2S$, 20% by volume of $SO_2$ and 10% by volume of COS. Solid residue is removed as free-flowing slag from the bottom of the combustion space and is quenched with water. The reaction gas is burned in a steam boiler fired from below, which is equipped with a stack gas treatment system for separating off the sulfur dioxide.

EXAMPLE 2

The experimental procedure corresponds to that of Example 1. The vacuum residue is replaced by powdered coal. The reaction gas contains hydrogen sulfide and carbonyl sulfide in similar amounts.

EXAMPLE 3

A process for spraying sulfate-containing wastewater into a coal dust burner for high pressure gassification for the preparation of synthesis gas.

Depending on the further processing of the gas produced, the burner is brought to a superatmospheric pressure of from 0 to 30 bar. In the intended reduction of sodium sulfate, the pressure is 0.5 bar. Ballast coal dust is made into a slurry with wastewater containing up to 60% of sodium sulfate. The resulting slurry is sprayed into the combustion space and oxygen is added for combustion. The reaction temperature reaches from 1300 to 1600° C. The reaction gas consists of CO, $CO_2$, steam, $H_2S$, COS and $SO_2$. The silicate-containing ballast of the coal dust gives a liquid slag, which is removed from the vertical combustion space. The ash contains sodium carbonate and small amounts of compounds of sodium and sulfur, in addition to sodium silicate.

We claim:

1. A process for working up a sodium sulfate-containing wastewater residue, wherein the sodium sulfate in the wastewater residue is thermally cleaved in the presence of a reducing agent and silicate-containing additives under reducing conditions at a temperature above 1000° C. to give gaseous sulfides and oxides of sulfur as well as a free-flowing alkaline slag.

2. The process of claim 1, wherein the reducing agent is selected from the group consisting of coal dust, heavy fuel oil, natural gas and hydrogen.

3. The process of claim 1, wherein the sodium sulfate-containing wastewater residue is thermally cleaved at a temperature about 1200° C.

4. The process of claim 1, wherein the resulting sulfur-containing reaction gas is burned in a steam boiler which is fired from below and the resulting $SO_2$ is separated off in a downstream regenerative stack gas scrubber.

* * * * *